United States Patent [19]
Takahashi et al.

[11] Patent Number: 5,429,384
[45] Date of Patent: Jul. 4, 1995

[54] CONTROL FOR SHOCK ABSORBER

[75] Inventors: Toru Takahashi; Makoto Kimura; Hiroyuki Shimizu, all of Kanagawa, Japan

[73] Assignee: Atsugi Unisia Corporation, Japan

[21] Appl. No.: 224,193

[22] Filed: Apr. 7, 1994

Related U.S. Application Data

[63] Continuation of Ser. No. 883,479, May 15, 1992, abandoned.

[30] Foreign Application Priority Data

| May 17, 1991 [JP] | Japan | 3-112996 |
| May 17, 1991 [JP] | Japan | 3-113509 |

[51] Int. Cl.⁶ .................... B60G 17/048; F16F 9/14
[52] U.S. Cl. .................... 280/707; 280/710; 280/709
[58] Field of Search ............ 280/707, 702, 703, 6.12, 280/709, 714, 710; 188/299

[56] References Cited

U.S. PATENT DOCUMENTS

| 4,696,489 | 9/1987 | Fujishiro et al. | 280/707 |
| 4,887,699 | 12/1989 | Ivers et al. | 280/707 |

FOREIGN PATENT DOCUMENTS

| 0270893 | 6/1988 | European Pat. Off. . |
| 0321078 | 6/1989 | European Pat. Off. . |
| 0403803 | 5/1990 | European Pat. Off. . |
| 0382480 | 8/1990 | European Pat. Off. . |
| 0484697 | 10/1991 | European Pat. Off. . |
| 3738048 | 5/1989 | Germany . |
| 4015035 | 11/1990 | Germany . |
| 61-163011 | 7/1986 | Japan . |
| 361736 | 3/1991 | Japan . |
| 1450441 | 9/1976 | United Kingdom . |
| 1524867 | 9/1978 | United Kingdom . |
| 2229253 | 9/1990 | United Kingdom . |
| 2234572 | 2/1991 | United Kingdom . |
| WO8606807 | 11/1986 | WIPO . |
| WO9014240 | 11/1990 | WIPO . |
| 9106439 | 5/1991 | WIPO . |

*Primary Examiner*—Margaret A. Focarino
*Assistant Examiner*—F. Zeender
*Attorney, Agent, or Firm*—Ronald P. Kananen

[57] ABSTRACT

The damping coefficient of a shock absorber of a suspension unit for a vehicle body of an automobile is varied in accordance with a vertical speed of the vehicle body such that it is normally varied in proportion to said vertical speed indicative signal however, from the time the vertical speed satisfies a predetermined relationship with a threshold level the largest damping coefficient is established and maintained and until the vertical speed reaches a peak.

1 Claim, 15 Drawing Sheets

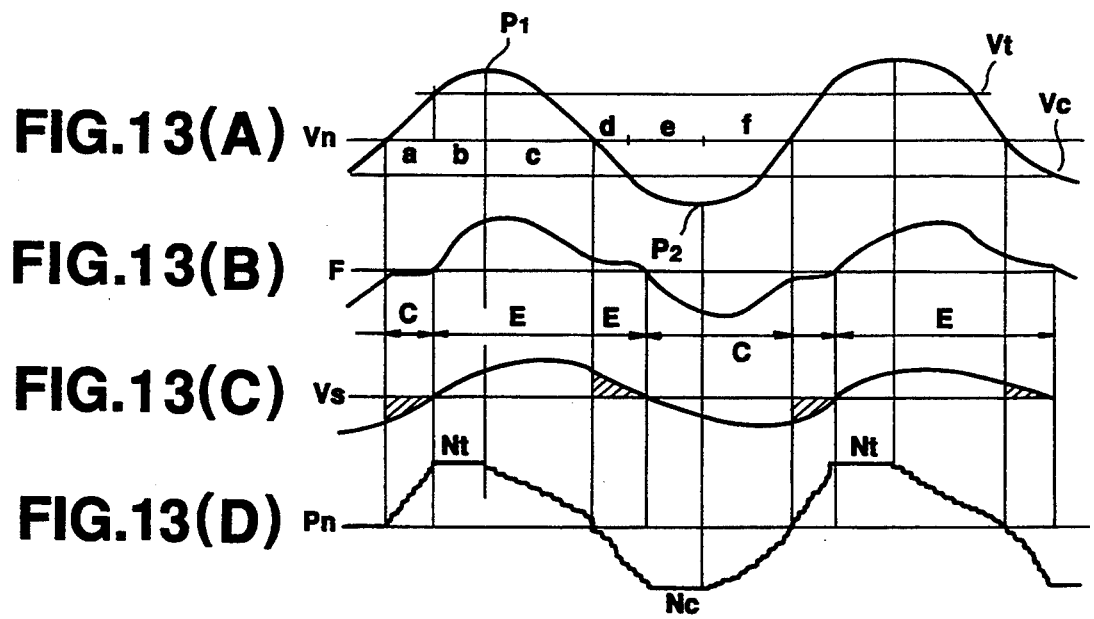
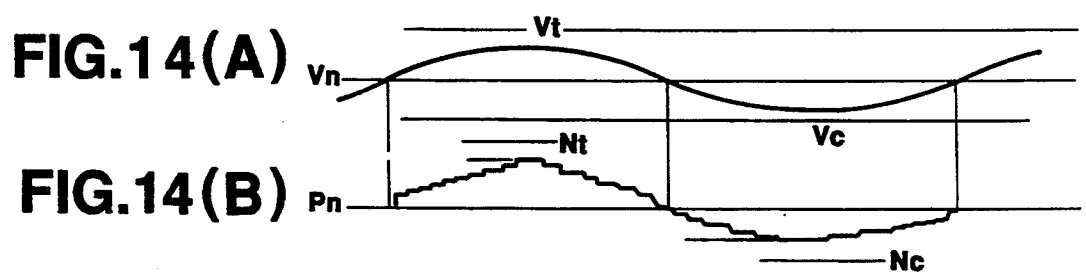

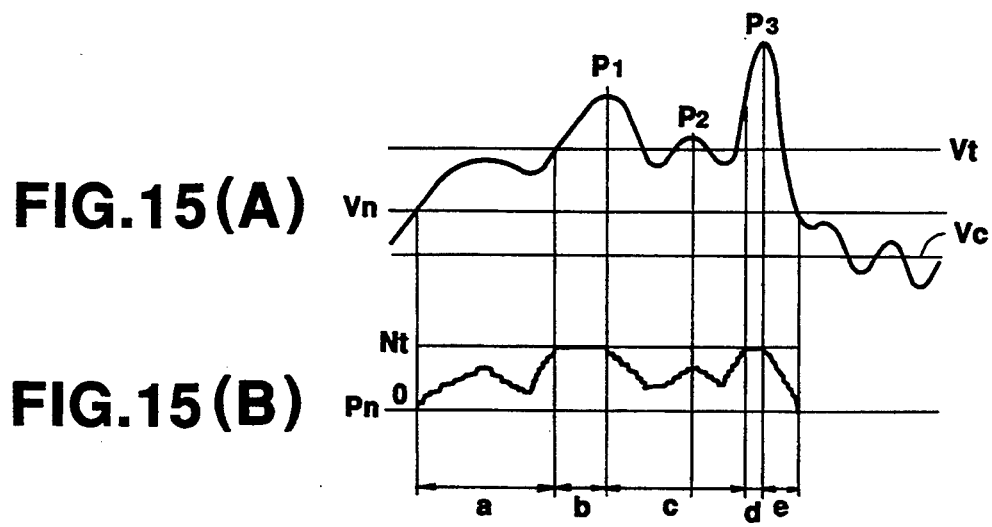
FIG.15(A)
FIG.15(B)
FIG.17
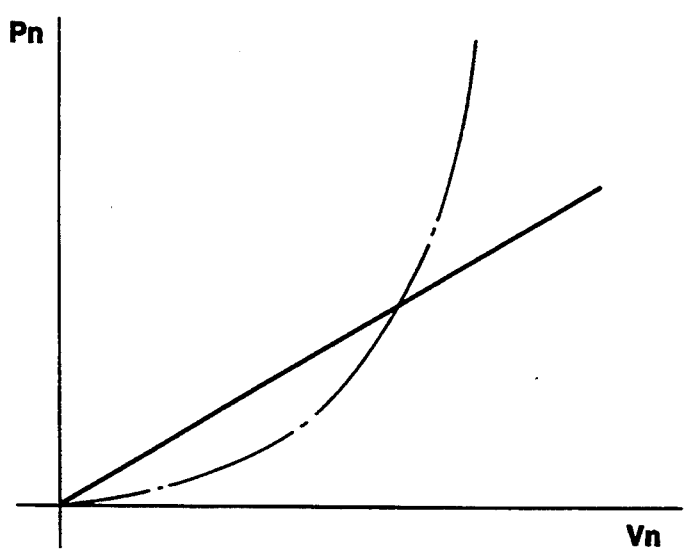

CONTROL FOR SHOCK ABSORBER

This application is a continuation of application Ser. No. 07/883,479 filed May 15, 1992, now abandoned.

BACKGROUND OF THE INVENTION

The present invention relates to a shock absorber and more particularly to a system for controlling the damping characteristic of a shock absorber.

In order to provide an improved ride quality, Japanese patent Application First (unexamined) Publication 61-163011 discloses a control system for shock absorbers in suspension units supporting a vehicle body of an automobile. To control the damping force of the shock absorber, a vertical speed or velocity of that portion of the vehicle body which is adjacent the shock absorber and a relative speed within the shock absorber are used. A high damping force is provided when the relative speed and the vertical speed are in the same direction, while a low damping force is provided when the relative speed and the vertical speed are in the opposite directions.

An object of the present invention is to provide a system for controlling the damping characteristic which can provide an improved ride quality without relying on the relative speed in order to eliminate the use of a sensor for the purpose of deriving the relative speed.

SUMMARY OF THE INVENTION

According to the present invention, there is provided a vehicle comprising:

a vehicle body;

a suspension unit supporting said vehicle body and including a shock absorber, said shock absorber including an adjuster and being so constructed and arranged as to have different damping coefficients for different positions which said adjuster may assume;

means for generating a signal indicative of a vertical motion of that portion of said vehicle body which is adjacent said shock absorber; and means responsive to said signal for controlling said adjuster in response to a vertical speed which said portion of said vehicle body is subject to.

BRIEF DESCRIPTION OF THE DRAWINGS

FIG. 13(A) shows a sinusoidal variation of a vertical speed of the vehicle body;

FIG. 13(B) shows a variation of a damping force generated by the shock absorber:

FIG. 13(C) shows a variation of a piston speed relative to a cylinder of the shock absorber;

FIG. 13(D) shows a variation of target position or damping coefficient;

FIG. 14(A) shows another example of variation of the vertical speed;

FIG. 14(B) shows a variation of the target position or damping coefficient;

FIG. 15(A) shows still another example of variation of the vertical speed;

FIG. 15(B) shows a variation of the target or damping coefficient;

FIG. 17 is a graph wherein the solid line illustrates the effect of the equation used in the routine 200 (FIG. 12) and the one-dot chain line illustrates the equation used in the routine 300 (FIG. 16);

DETAILED DESCRIPTION OF THE INVENTION

Figure 1:
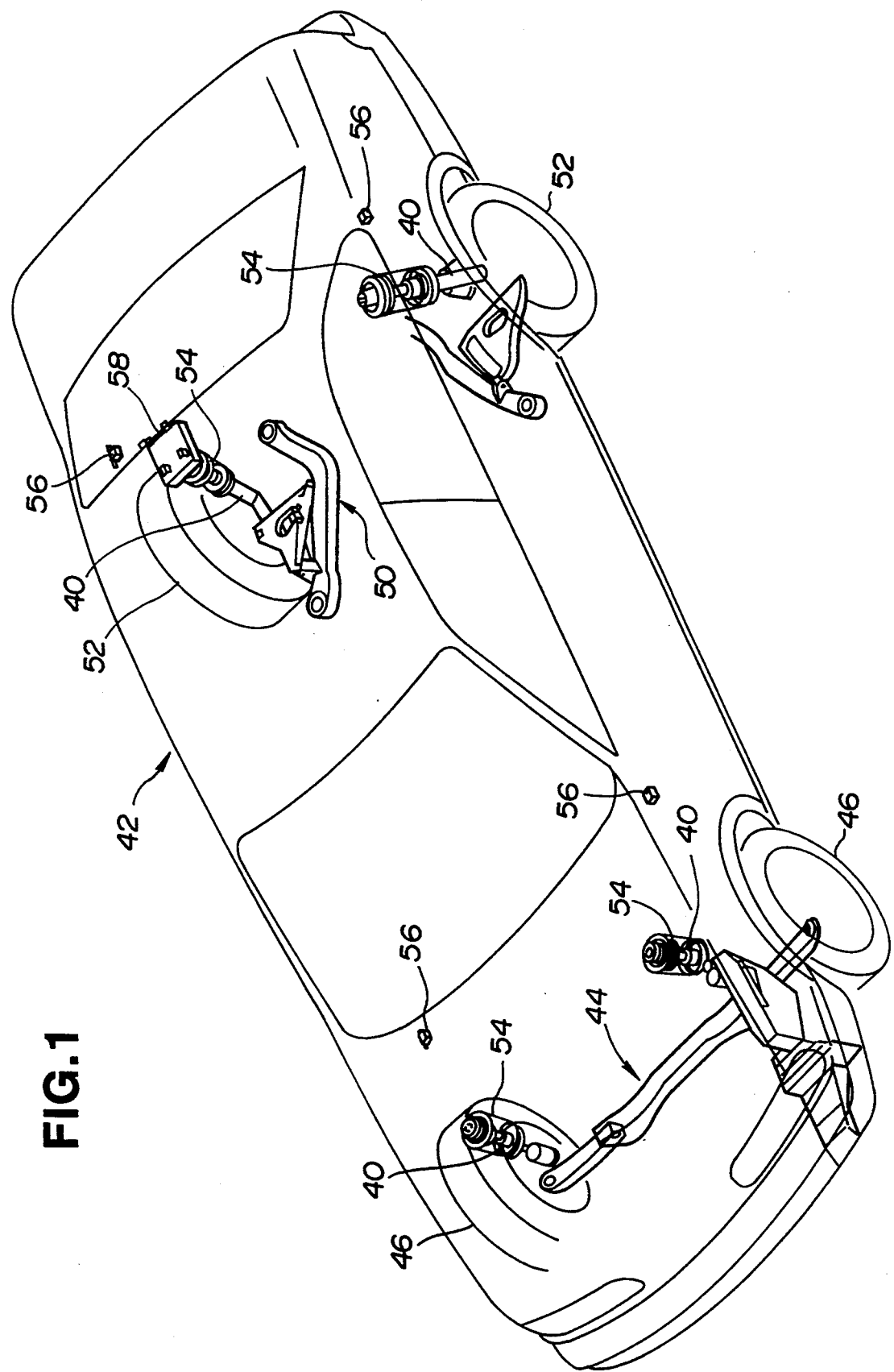
FIG. 1 is a schematic representation of an apparatus for controlling mechanical shock in operative association with an automobile.
Figure 2:
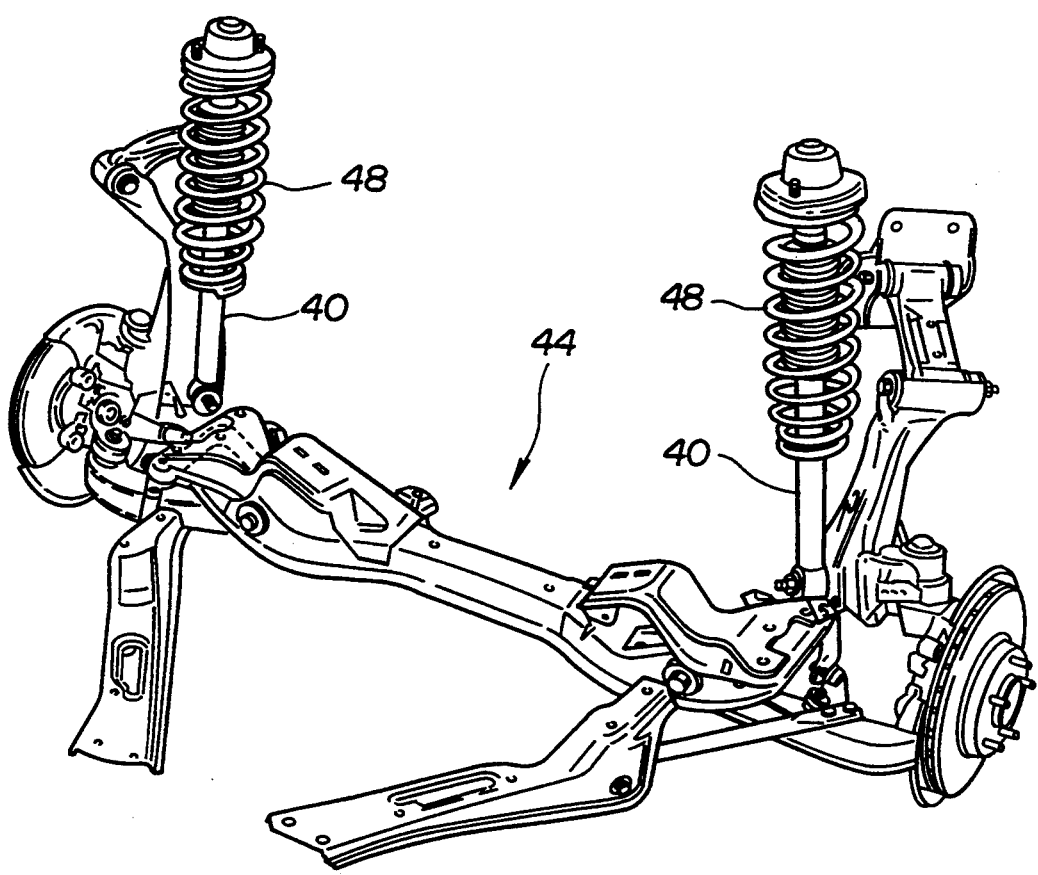
FIG. 2 is a perspective view of a front suspension unit used to support the vehicle body of the automobile.
Figure 3:
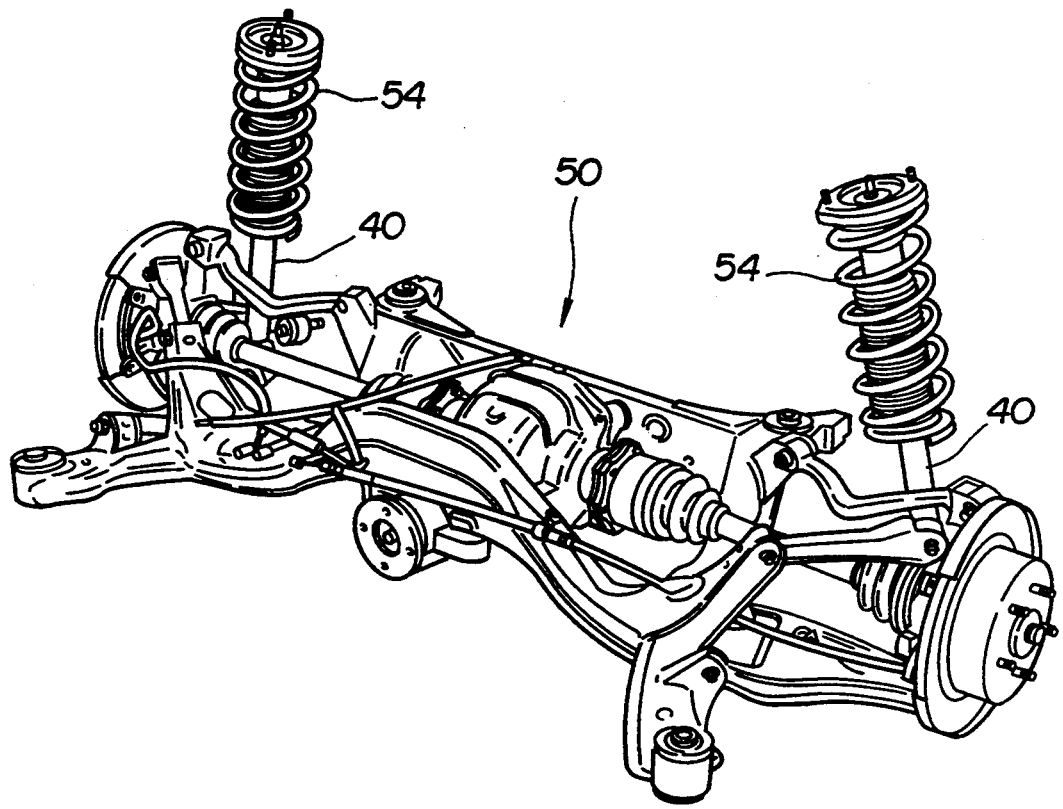
FIG. 3 is a perspective view of a rear suspension of a rear suspension unit used to support the vehicle body of the automobile.
Figure 4:
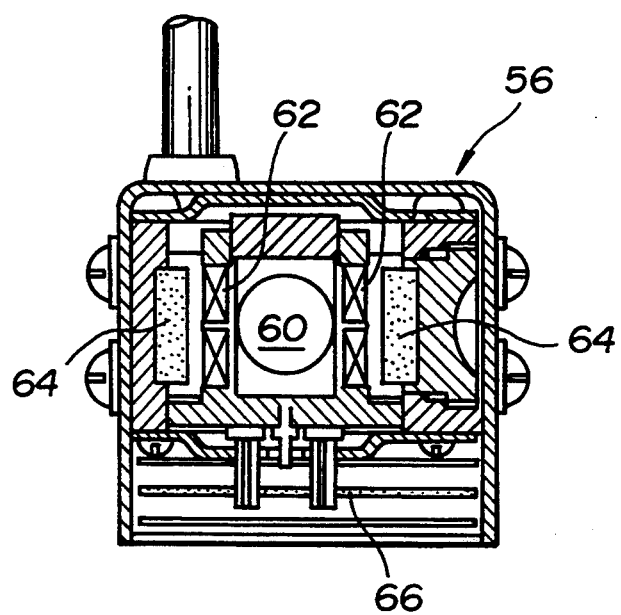
FIG. 4 is a sectional view of a vertical accelerometer of the ball displacement detection type.

Referring to FIG. 1, a plurality of four shock absorbers 48 are shown in operative association with a diagrammatic representation of a conventional automobile 42. The automobile 42 includes a front suspension unit 44, which as best seen in FIG. 2, operatively support the vehicle's front wheels 46. The front suspension unit 44 is operatively connected to the vehicle's body by means of a first pair of the shock absorbers 40 as well as by helical coil springs 48. Similarly, the automobile 42 has a rear suspension unit 50, which as best seen in FIG. 3, operatively supporting the rear wheels 52. The rear suspension unit 50 is operatively connected to the vehicle body by means of a second pair of the shock absorbers 40 as well as by helical coil springs 54. The shock absorbers 40 serve to damp the relative movement of the unsprung portion, i.e., the front and rear suspensions 44 and 50, and the sprung portion, i.e., the body, of the automobile 42. The automobile 42 has a plurality of four sensors, i.e, four vertical accelerometers 56, and a control unit 58. These sensors 56 are attached to four portions of the vehicle body adjacent the four shock absorbers 40, respectively. As best seen in FIG. 4, the sensors 56 are of the ball detection displacement type and provide an analog output, i.e., an acceleration indicative analog signal. Referring to FIG. 4, the sensor 56 has a steel ball 60 surrounded by a detection coil 62 which in turn is surrounded by a magnet 64 and a circuit 66. The output of the four sensors 56 are fed to the control unit 58.

Figure 5:
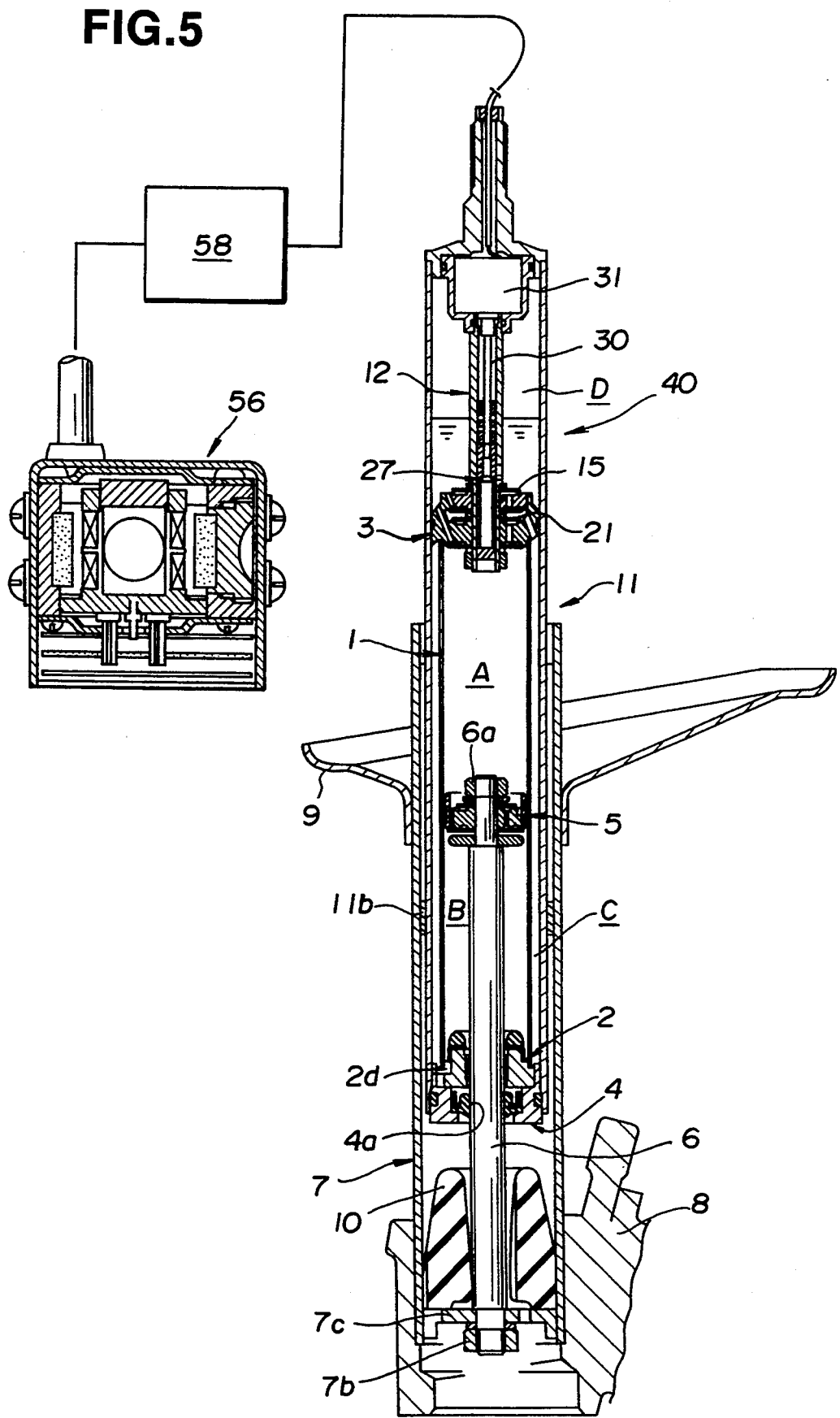
FIG. 5 is a longitudinal section of a shock absorber of the damping characteristic varying type which is responsive to a control signal generated by a control unit which modifies the control signal in response to a target position determined in response to an output of the vertical accelerometer.

As shown in FIG. 5, the control unit 58 is operatively connected to the shock absorber 40. The shock absorber 40 is shiftable to a plurality of positions, each corresponding to one of the plurality of different damping characteristics which the shock absorber 40 has.

The shock absorber 40 is known according to Japanese Patent First (unexamined) Publication 3-61736 published on Mar. 18, 1991. This shock absorber as well as similar ones are described in U.S. patent application Ser. No. 07/552,539 filed on Jul. 16, 1990, DE 40 22 688 A1 published on Mar. 14, 1991 or GB 2 234 572 A published on Feb. 6, 1991.

Figure 6:
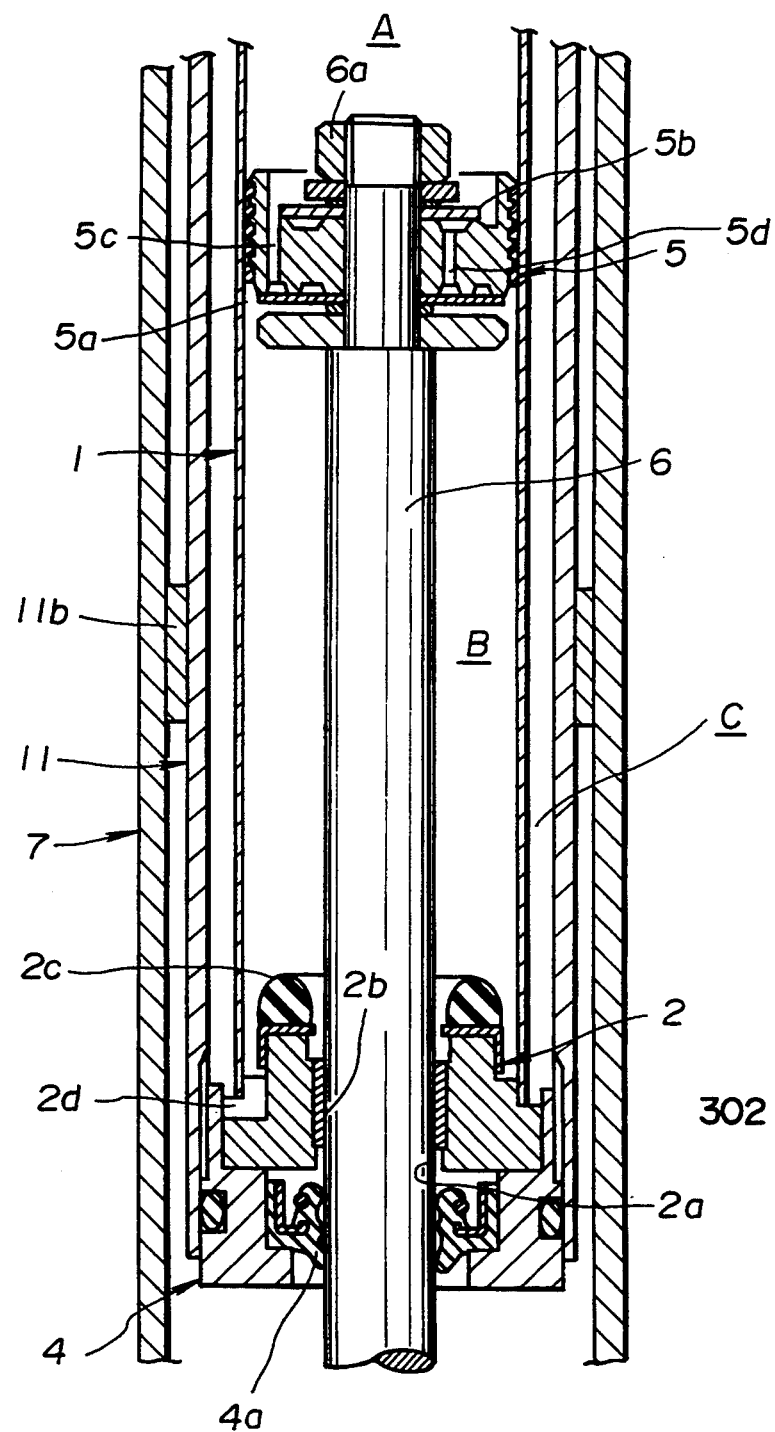
FIG. 6 is an enlarged fragmentary view of FIG. 5 illustrating a piston assembly.

Referring to FIG. 5, the shock absorber 40 includes a cylinder tube 1 having a lower end with a guide member 2 and an upper end with a base 3. A hydraulic fluid, i.e., a damper oil, fills the inside of the cylinder tube 1. As best seen in FIG. 6, the guide member 2 is formed with a through hole 2a receiving a seal 2b. Thus, the guide member 2 has a stop rubber 2c attached thereto. Fixedly coupled with the guide member 2 is a seal retainer 4 with an oil seal 4a. A piston 5 slidably disposed in the cylinder tube 1 divides the interior of the cylinder tube 1 into an upper chamber A and a lower chamber B.

Referring to FIG. 6, the piston 5 has a disc valve 5a and a disc valve 5b. The disc valve 5a is effective for generating a damping force which resists the motion of the piston 5 during compression motion of the shock absorber 40 by restricting flow of fluid through a passage 5c. The other disc valve 5b is effective to generate a damping force against motion of the piston 5 during extension motion of the shock absorber 40 by restricting flow of fluid through a passage 5d.

A piston rod 6 has an upper end fixedly connected to the piston 5 by means of a nut 6a and passes through the hole 2a. The piston rod 6 has a bottom end to which a bottom cap 7a is fixedly attached by means of a nut 7b (see FIG. 5). The bottom cap 7a is slidably disposed in a strut tube 7. The strut tube 7 has a bottom end portion fixed to a knuckle spindle 8 and has an upper end portion fixedly carrying a spring retainer 9 for supporting the associated-helical coil spring 54 (see FIG. 1). Designated by the reference numeral 10 is a stop rubber.

The cylinder tube 1 is disposed within an outer tube 11. The outer tube 11 has a lower end firmly supporting in fluid tight manner the seal retainer 4 and an upper end adapted to be attached to the vehicle body. The base 3 is immovably received in the outer tube 11. The outer tube 11 is telescopically received in the strut tube 7 by means of two axially spaced bearings 11a and 11b.

Defined between the cylinder tube 1 and the outer tube 11 is an annular outer chamber C. As best seen in FIG. 6, this chamber C has a lower end communicating with the lower chamber B via a passage 2d and an upper end closed by the base 3. Defined between the base 3 and the upper closed end of the outer tube 11 is a reservoir chamber D which contains a gas above the upper level of the hydraulic fluid.

Figure 7:
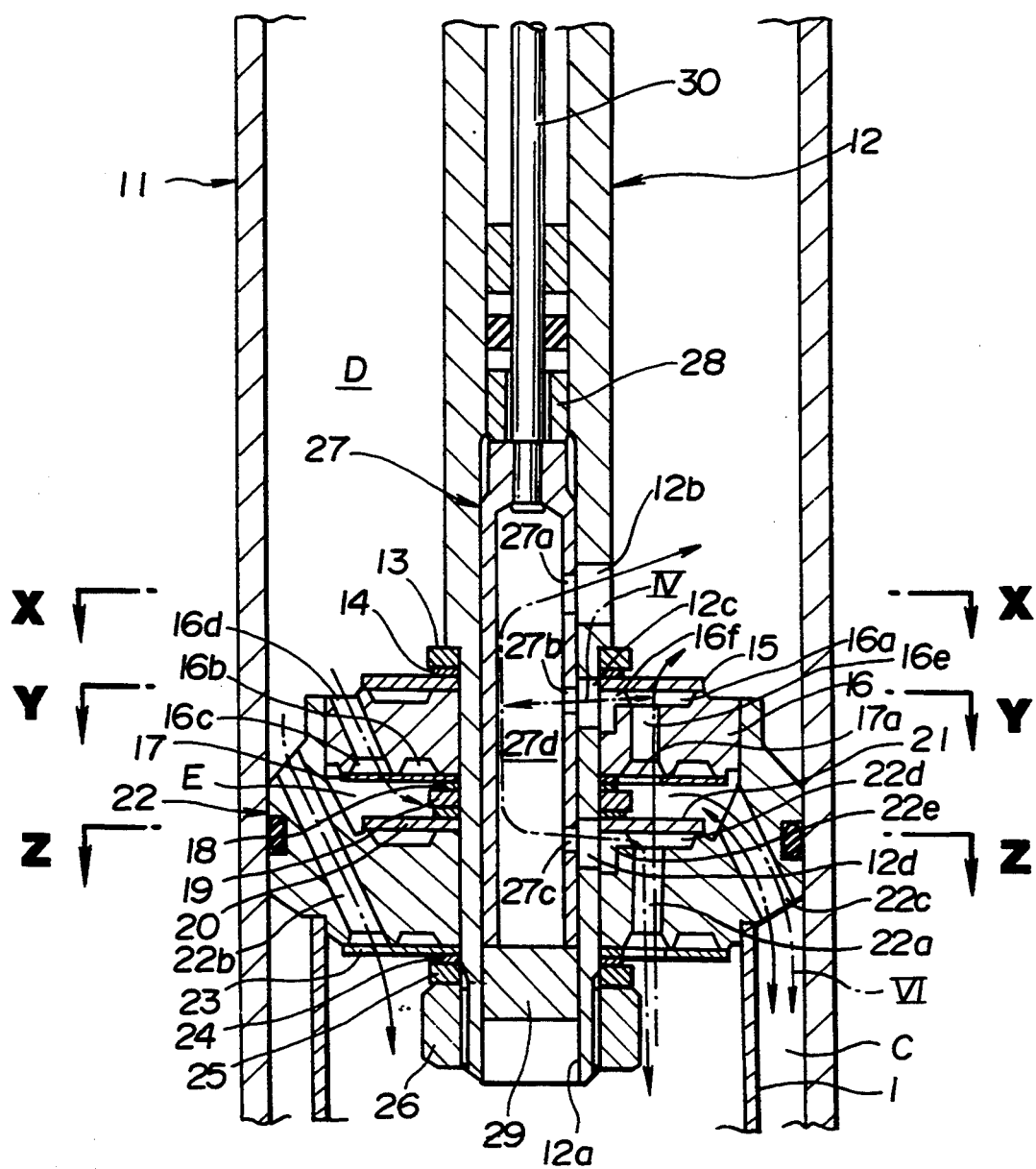
FIG. 7 is a fragmentary view of FIG. 5 as taken along section line W—W of FIGS. 8, 9 and 10.

Referring to FIG. 7, there is shown a hollowed support rod 12 on which the base 3 is fixedly mounted. In assembly, a retainer 13, a washer 14, a second disc valve 15, a second valve body 16, a second check valve 17, a washer 18, a retainer 19, a washer 20, a first disc valve 21, a first valve body 22, a first check valve 23, a washer 24 and a retainer 25 are fitted on the support rod 12 one after another in this order and fixed to the support rod 12 by means of a nut 26.

The second valve body 16 is received in a recess of the first valve body 22 and held in a spaced relationship with the bottom wall of the recess owing to the provision of the retainer and washers 18 and 20. Thus, an internal chamber E is defined between the valve bodies 22 and 16.

Figure 10:
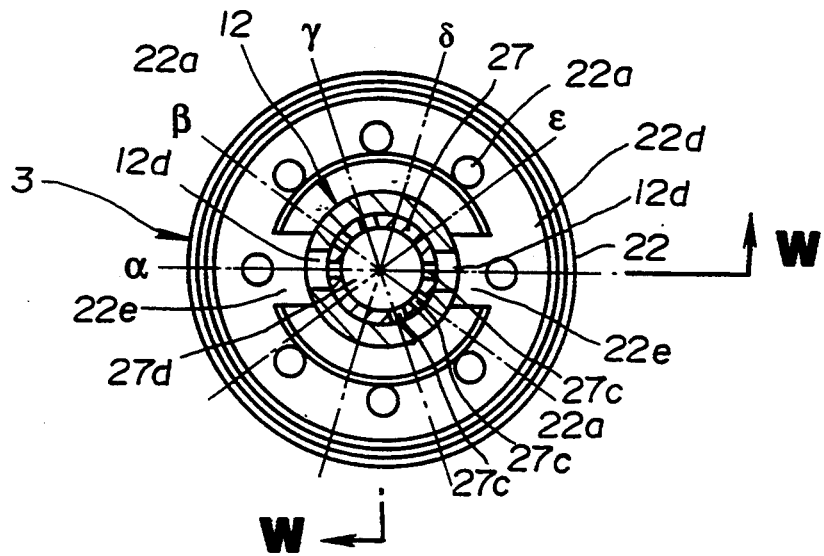
FIG. 10 is a section taken along the line Z—Z in FIG. 7.

As best seen in FIG. 10, the bottom wall of the recess of the first valve body 22 is formed with an annular groove 22d. Extending through the first valve body 22 are a first set of holes 21a for establishing a fluid communication between the upper chamber A and the annular groove 22e which is covered by the valve disc 21. In order to establish a one-way fluid flow from the reservoir chamber D to the upper chamber A, the first valve body 22 has a one-way flow passage 22b with which the first check valve 23 is associated. In order to establish a fluid communication between the internal chamber E and the outer chamber C, there is a passage 22c extending through the first valve body 22.

The upper wall of the second valve body 16 is formed with an annular groove 16a. The lower wall of the second valve body 16 has an inner annular groove 16b and an outer annular groove 16c. In order to establish a one-way fluid flow from the reservoir chamber D to the internal chamber E, the second valve body 16 has a second one-way flow passage 16d with which the second check valve 17 is operatively associated. A second set of holes 14e extend through the second valve body 16 for establishing fluid communication between the internal chamber E and the annular groove 16a which is covered by the valve disc 15.

Figure 8:
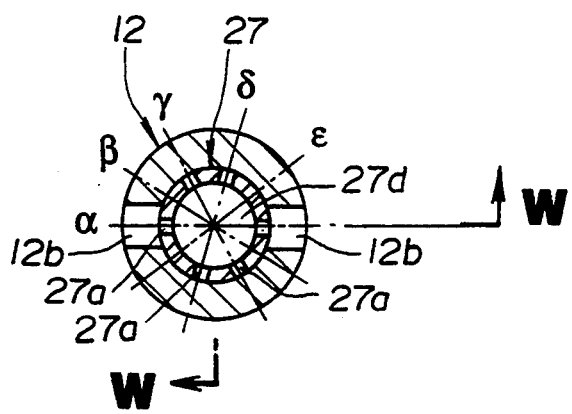
FIG. 8 is a section taken along the line X—X in FIG. 7.
Figure 9:
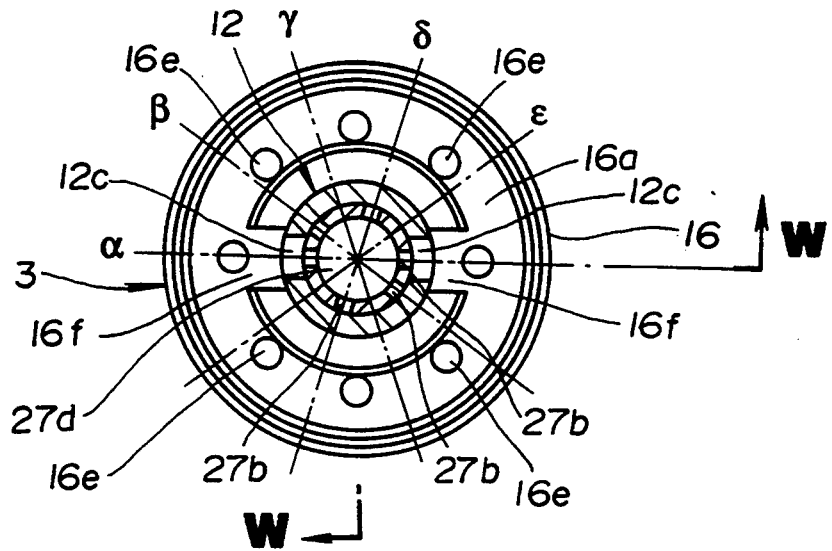
FIG. 9 is a section taken along the line Y—Y in FIG. 7.

The support rod 12 has an axial through bore 12a and a first pair of diametrically opposed ports 12b (see FIG. 8), a second pair of diametrically opposed ports 12c (see FIG. 9) and a third pair of diametrically opposed ports 12d (FIG. 10). These ports 12a, 12b and 12c are in communication with the axial bore 12a and are axially aligned as seen in FIGS. 8, 9 and 10. The first pair of ports 12b communicate with the reservoir chamber D. As best seen in FIG. 9, an inner land surrounded by the annular groove 16a are radially cut to form a pair of diametrically opposed mating bores 16f. Via these mating bores 16f, the second pair of ports 12c communicate with the annular groove 16a which in turn communicates with the interior chamber E (see FIG. 7). Similarly, as seen in FIG. 10, an inner land surrounded by the annular groove 22d are radially cut to form a pair of diametrically opposed mating bores 22e. Via these mating bores 22e, the third pair of ports 12d communicate with the annular groove 22d which in turn communicates with the upper chamber A (see FIG. 7).

Rotatably disposed in the axial bore 12a is a cylindrical adjuster 27 with a cylindrical bore 27d closed at both ends, one end being closed by a bushing 29. With this bushing 29 and another bushing 28, the adjuster 27 is supported for smooth rotary movement to a desired one of a plurality of angular positions. The adjuster 27 has a first set of six angularly spaced orifices 27a which are adapted to mate with the first pair of ports 12b (see FIG. 8), a second set of six angularly spaced orifices 27b which are adapted to mate with the second pair of ports 12c (see FIG. 9), and a third set of six angularly spaced orifices 27c which are adapted to mate with the third pair of ports 12d (see FIG. 10).

Referring to FIGS. 8, 9 and 10, the first set of orifices 27a are arranged on three radial planes, namely, an alpha plane as indicated by a phantom line alpha, a gamma plane as indicated by a phantom line gamma and a delta plane as indicated by a phantom line delta. The second set of orifices 27b are arranged on three radial planes, namely, the alpha plane, a beta plane as indicated by a phantom line beta, and the delta plane. The third set of orifices 27c are arranged on three radial planes, namely, the alpha plane, the beta plane and the gamma plane. There is an epsilon plane as indicated by a phantom line epsilon. The total five radial planes, namely, the alpha, beta, gamma delta and epsilon planes, are equi-anglarly spaced one after another in this order.

As shown in FIG. 5, the adjuster 27 has a control rod 30 drivingly connected to an actuator in the form of a stepper motor 31. The stepper motor 31 is fixedly mounted to an end cap closing an upper end of the outer tube 11.

In response to the output of the control unit 58, the stepper motor 31 turns to a target position determined by the control unit 58.

Figure 11:
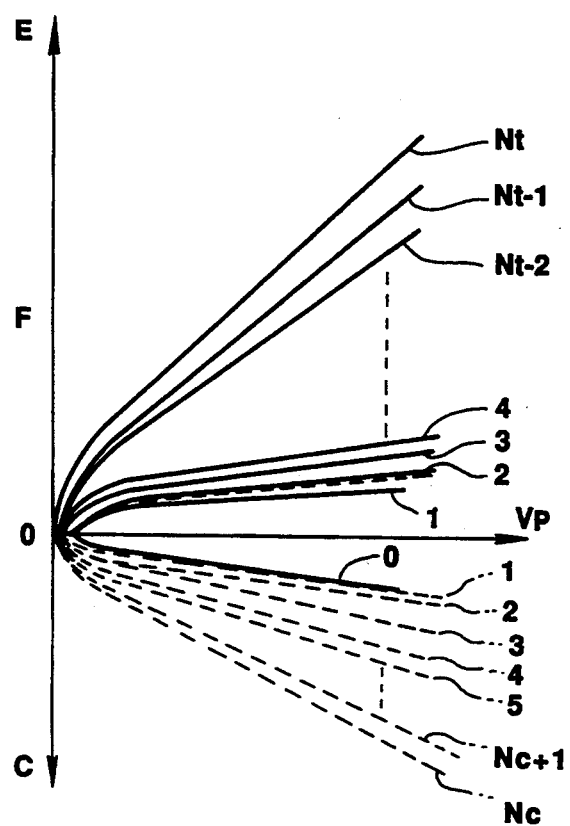
FIG. 11 show various damping force F versus piston speed Vp characteristic curves.

FIG. 11 shows various different damping characteristic curves. A family of fully drawn curves represent that, during motion of the shock absorber 40 in the extended state, abbreviated as E, the damping coefficient and the damping force, abbreviated as F, increase as the adjuster advances in one direction from zero position although the damping coefficient during motion of the shock absorber in the compressed state, abbreviated as C, is fixed. It will be noted that the damping coefficient during motion of the shock absorber in the extended state E is greater than the damping coefficient during motion of the shock absorber in the compressed state C.

A family of broken line curves represent that, during motion of the shock absorber 40 in the compressed state C, the damping coefficient and the damping force F increase as the adjuster advances in the opposite direction from zero position although the damping coefficient during motion of the shock absorber in the extended state E is fixed. It will be noted that the damping coefficient during motion of the shock absorber in the compressed state C is greater than the damping coefficient during motion of the shock absorber in the extended state E.

The target position which the stepper motor 31 should be set is determined by the control unit 58. The control unit 58 stores a routine 200 which determines the target position and a routine, not shown, which modifies the output supplied to the stepper motor 31 in accordance with the determined target position.

Figure 12:
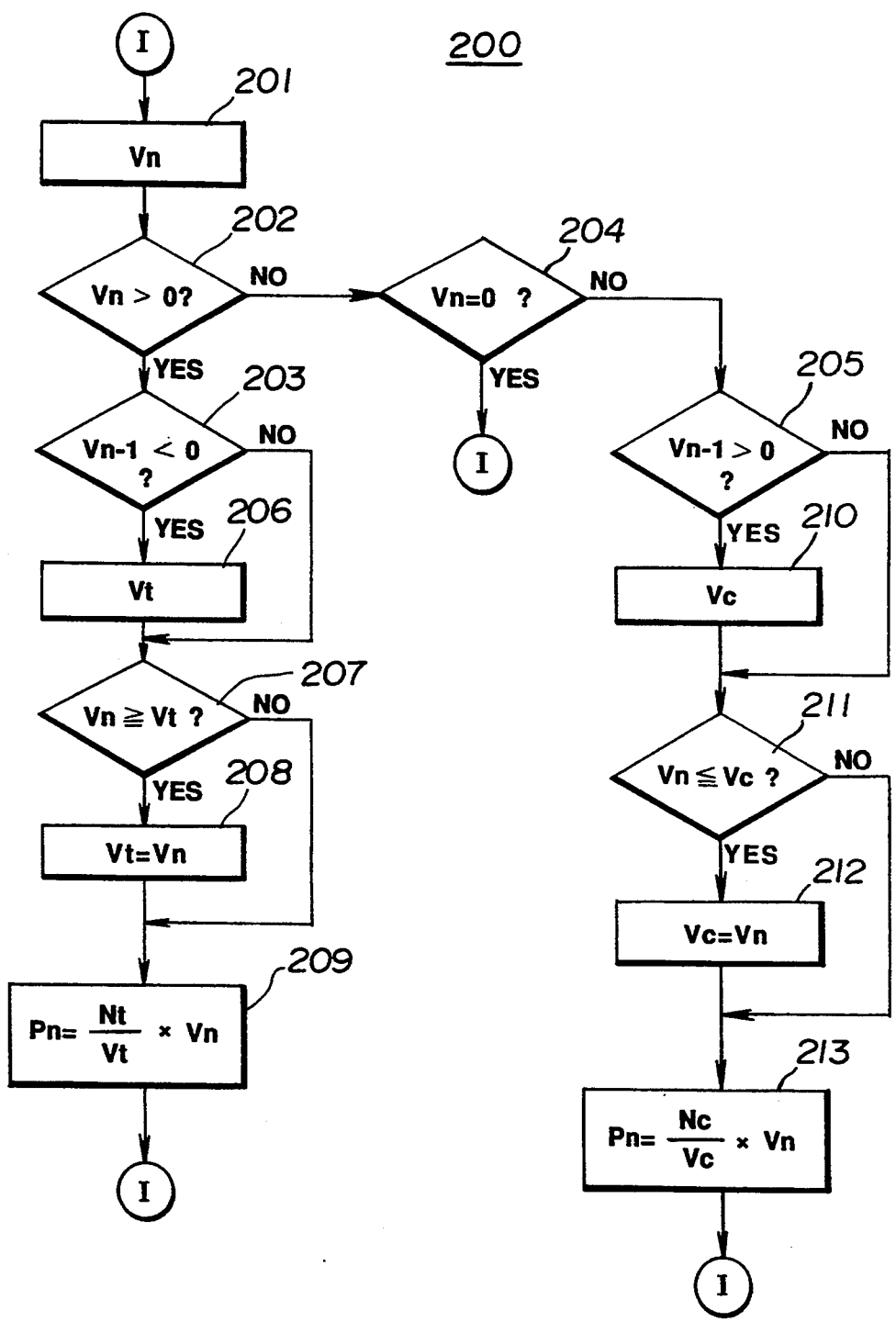
FIG. 12 is a flow diagram of a routine stored in the control unit.

Referring to FIG. 12, the routine 200 is explained. The execution of this routine is repeated upon elapse of a predetermined period of time.

At a block 201, a vertical speed Vn of the vehicle body is derived from a vertical acceleration indicative signal generated by the associated vertical accelerometer 56 by effecting integration with respect to the cycle time, viz., the predetermined period of time. Suffix n denotes the number of repetition of execution of this routine and thus changes 1, 2, 3 . . . n.

There is an interrogation at a block 202 whether the speed value Vn is positive or not. If this is the case (YES), there is an interrogation at a block 203 whether a vertical speed value Vn-1 obtained during the previous run of this routine is negative or not. If the interrogation at the block 202 results in a negative outcome, there is an interrogation at a block 204 whether the speed Vn is zero or negative. If the interrogation at the block 204 results in an affirmative outcome, the routine returns to an initial point I, while if it results in negative, the routine proceeds to a block 205 in which there is an interrogation whether the speed value Vn-1 obtained during the previous run of this routine is positive or not.

If the vehicle body moves upward and thus the speed value Vn is positive, the routine proceeds by way of the interrogation block 203. If the vehicle body moves downward and thus the speed value Vn is negative, the routine proceeds by way of the interrogation block 205.

Assuming now that the speed value Vn is positive and the previously obtained speed value Vn-1 is negative, the routine proceeds from the block 203 to a block 206 where a threshold level Vt is initialized and set equal to a predetermined positive value. This block 206 is followed by an interrogation at a block 207 whether the speed value Vn is greater than or equal to the threshold Vt or not. If this is the case, the threshold level Vt is updated by setting Vn as Vt at a block 208. At a step 209, a target position Pn is given by conducting the computation of an equation that $Pn=(Nt/Vt) \times Vn$, where, Nt: denotes a position at which the damping is the largest during motion of the shock absorber in its extended state.

Assuming now that the speed value Vn is negative and the previous speed value Vn-1 is positive, the routine proceeds from the block 205 to a block 210 where a threshold level Vc is initialized and set equal to a predetermined negative value. There is an interrogation at a block 211 whether the speed value Vn is less than or equal to the threshold level Vc or not. If this is the case, the threshold level Vc is updated by setting Vn as Vc at a block 212. At a step 213, the target position Pn is given by conducting the computation of an equation that $Pn=(Nc/Vc) \times Vn$, where, Nc: denotes a position at which the damping force is the largest during motion of the shock absorber in its compressed state.

Although not shown, there is a routine whereby the control signal generated by the control unit 58 is modified. Thus, the stepper motor 31 turns the adjuster 27 toward the target position Pn.

The operation is explained.

Let us first consider the case where the trace of plots of the vertical speed of the vehicle body with respect to time draws a sine wave as shown in FIG. 13(A) with its positive peak above the initial threshold level Vt and its negative peak below the initial threshold level Vc. FIG. 13(C) shows the trace of plots of the relative speed within the shock absorber with respect to time, and a cycle of compressed and extended states of the shock absorber as abbreviated by the reference Capital characters C and E, respectively.

In FIG. 13(A), during a phase a, the speed value Vn is positive and increasing, but still less than the initial threshold level Vt. During this phase a, the execution along blocks 201, 202, 203, 207, and 209 is repeated after the execution along blocks 201, 202, 203, 206, 207 and 209 once. With the ratio of Nt to Vt fixed, the computation of the equation that $Pn=(Nt/Vt) \times Vn$ is repeated at the block 209 to give a target position Pn. Thus, the target position Pn increases with an increase in the speed value Vn as shown in FIG. 13(E). During this phase a, the shock absorber is still in the compressed state, but progresses toward the extended state. As shown in FIGS. 13(D), the damping coefficient for motion of the shock absorber in the extended state increases. Besides, the damping coefficient varies in proportion to the vertical speed of the vehicle body, suppressing a rapid change in damping force. As a result, noises and/or vibrations are suppressed. During the phase a, the damping coefficient for motion Of the shock absorber in the compressed state is the smallest, and the input force imparted to the shock absorber from the tire is absorbed by the helical coil spring 54 only.

Upon the speed value Vn reaching or exceeding the initial threshold level Vt, the subsequent phase b is initiated. Upon or after this moment, the routine proceeds from the block 207 to blocks 208 and 209 in the subsequent executions of the routine 200. Since the threshold level Vt is updated at the block 208, the ratio Vn/Vt is one during computation of the equation at the block 209. As a result, the computation of this equation always results in Pn=Nt. Thus, the target position Pn is held at Nt and the largest damping coefficient is maintained during this phase b as shown in FIG. 13(D). This phase b ends with a change in sign of the speed value Vn from positive to negative.

Immediately after the speed value Vn has made a positive peak P1, a phase c is initiated. This phase c continues until the speed value Vn becomes zero. During this phase c, execution of the blocks 201, 202, 203, 207 and 209 is repeated. With the ratio Nt/Vt fixed, computing the equation at the block 209 gives the result that the target position Pn decreases with a decrease in Vn as shown in FIG. 13(D). Thus, the damping coefficient is in proportion to speed value Vn during this phase c.

Upon or after the speed value Vn becoming zero, a phase d is initiated. This phase d continues immediately before the speed value Vn drops to zero. During execution of the routine 200 immediately after the sign of the speed value Vn has changed from positive to negative, the routine proceeds from the block 205 to the block 210 where the threshold level Vc is initialized. Subsequently, the routine proceeds through the blocks 201, 202, 204, 205, 211 and 213. Thus, with Vc and NC fixed, computation of the equation is repeated at the block, diving the result that the position Pn decreases with a decrease in the sprung speed Vn during this phase d. During this phase c, the shock absorber progresses toward the compressed state although it is still in the extended state.

Upon or after the speed value Vn dropping to the threshold level Vc, a phase e is initiated. This phase e ends immediately after the speed value Vn has made a negative peak P2. During this phase e, the routine proceeds along the block 201, 202, 204, 205, 211, 212 and 213. As a result, the position Pn is held at the largest damping coefficient for motion of the shock absorber in the compressed state.

After the negative peak P2, the speed value Vn begins to increase and a phase f is initiated. This phase f continues until the speed value Vn becomes zero. During this phase f, the routine proceeds along the blocks 201, 202, 204, 205, 211 and 213. Thus, since the ratio Nc/Vc is fixed, the computation of the equation Pn=(Nc/Vc)×Vn at the block 213 results in that the target position Pn increases with an increase in the speed value Vn as shown in FIG. 13(D).

From the preceding description, it will now be appreciated that the damping coefficient is proportional to the vertical speed value Vn during the phases a, c, d and f, but the largest damping coefficient is maintained during the phases b and e. This means that the largest maximum force is generated during the phase b or e when the speed value Vn approaches its peak after having passed the initial threshold level Vt or Vc.

Referring to FIGS. 14(A) and 14(B), let us now consider the case where the trace of plots of the speed value Vn with respect to time draws a sine wave as shown in FIG. 14(A) with its positive and negative peaks falling between the initial threshold levels Vt and Vc. In this case, the initial threshold levels Vt and Vc are maintained. Thus, the target position Pn is in proportion to the speed value Vn.

Referring to FIGS. 15(A) and 15(B) let us now consider the case where the speed value Vn makes three peaks P1, P2 and P3 subsequently without changing its sign. During a phase a, the target position Pn is in proportion to the speed value Vn since the speed value Vn fails to reach the initial threshold level Vt.

During a phase b which begins when the speed value Vn exceeds the initial threshold level Vt and continues until the speed value Vn makes the peak P1, the largest target position Nt is maintained.

During a phase c which begins after the speed value Vn has made the peak P1 and continues till the speed value Vn reaches the initial threshold level Vt, the target position Pn is in proportion to the speed value Vn since the threshold level Vt is not initialized nor subject to updating at the block 208 and remains at the peak value P1.

After the sprung speed Vn has reached the value as high as the peak P1, a phase d is initiated. The phase d ends when the speed value Vn reaches the peak P3 that is higher than the peak P1. During this phase d, the target position Pn is held at the largest value Nt.

During a phase e which begins after the speed value Vn has made the peak P3 and ends when the speed value Vn drops to zero, the target position Pn is in proportion to the speed value Vn.

From the preceding description of the first embodiment, it will be readily understood that the output of the accelerometer is relied on to control the operation of the shock absorber, so that the control is simplified. Besides, the control of the damping coefficient is based on the vertical speed of the vehicle body that is subject to a variation with a relatively low frequency. Thus, there is no substantial delay in a change of the damping characteristic in response to a change of the vertical speed.

Figure 16:
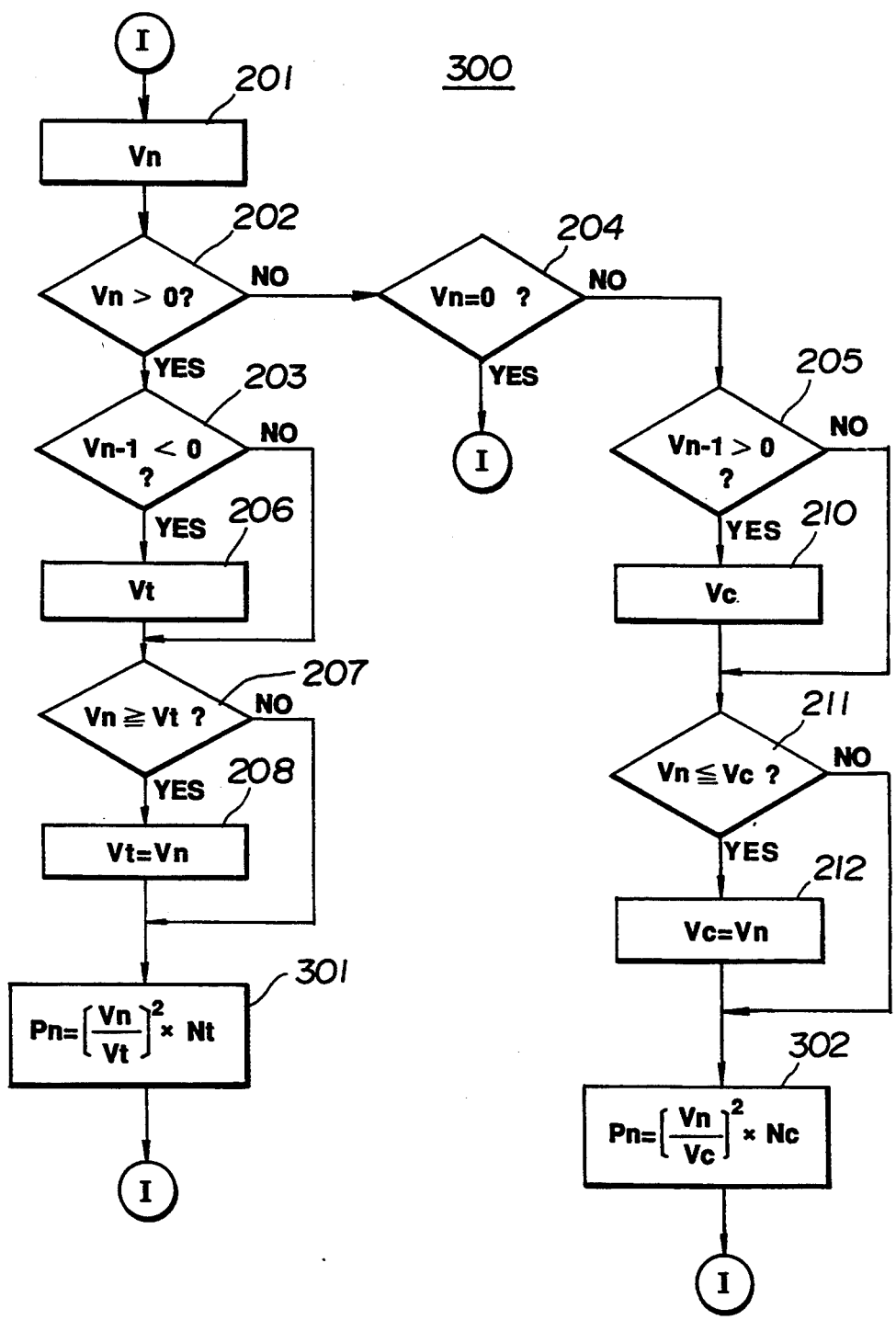
FIG. 16 is a flow diagram of a routine 300 which is a modification of the routine 200 shown in FIG. 12.

Referring to FIG. 16, a second embodiment is explained.

The second embodiment is substantially the same as the first embodiment except the use of a routine 300 instead of the routine 200. The routine 300 is different from the routine 200 in that two blocks 301 and 302 are used instead of the blocks 209 and 213. At the block 301, the target position Pn is given by computing the equation that $Pn=(Vn/Vt)^2 \times Nt$ or at the block 302, the target position Pn is given by computing the equation that $Pn=(Vn/Vc)^2 \times Nc$.

The relationship between the target position Pn with the vertical speed Vn is illustrated in FIG. 17. In FIG. 17, the fully drawn line illustrates the equation at the block 209 of the routine 200, while the phantom line illustrates the equation at the block 301.

Figure 18:
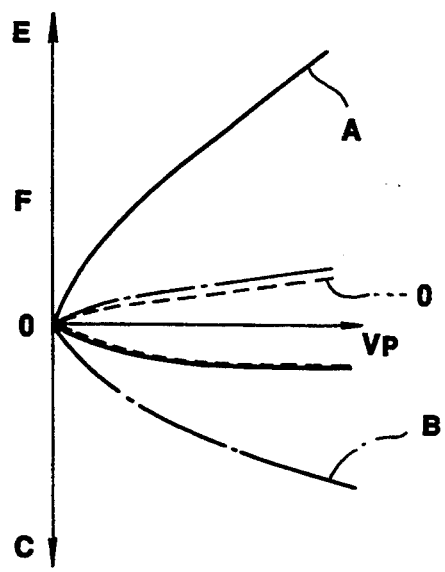
FIG. 18 shows three kinds of damping characteristics.
Figure 19:
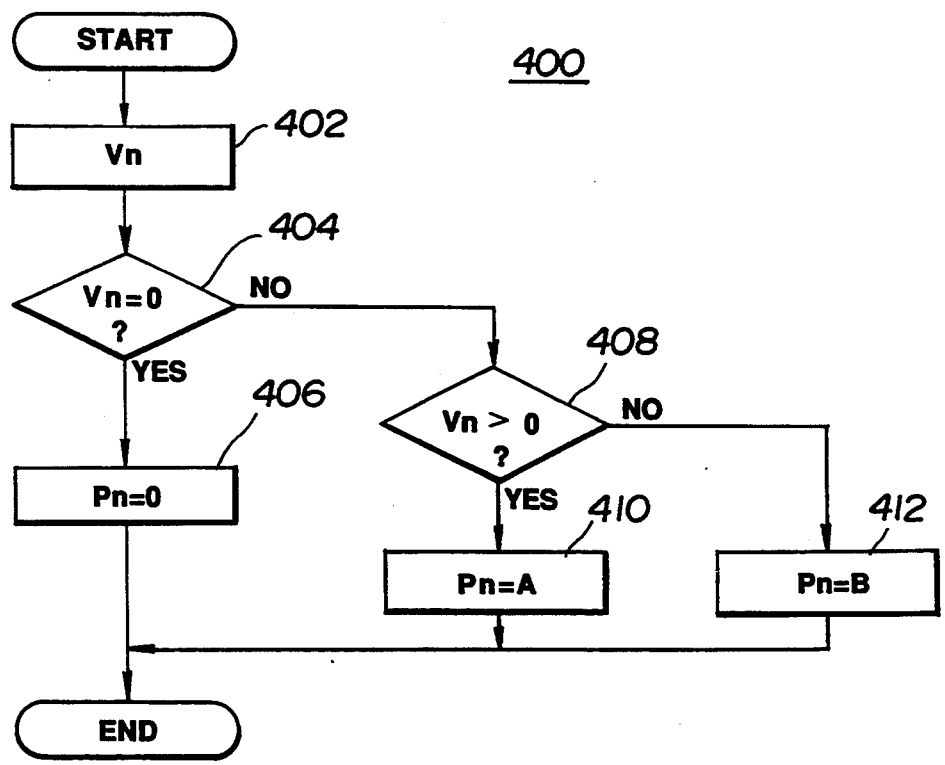
FIG. 19 is a flow diagram of a simplified routine 400.
Figures 20A, 20B, 20C, 20D:
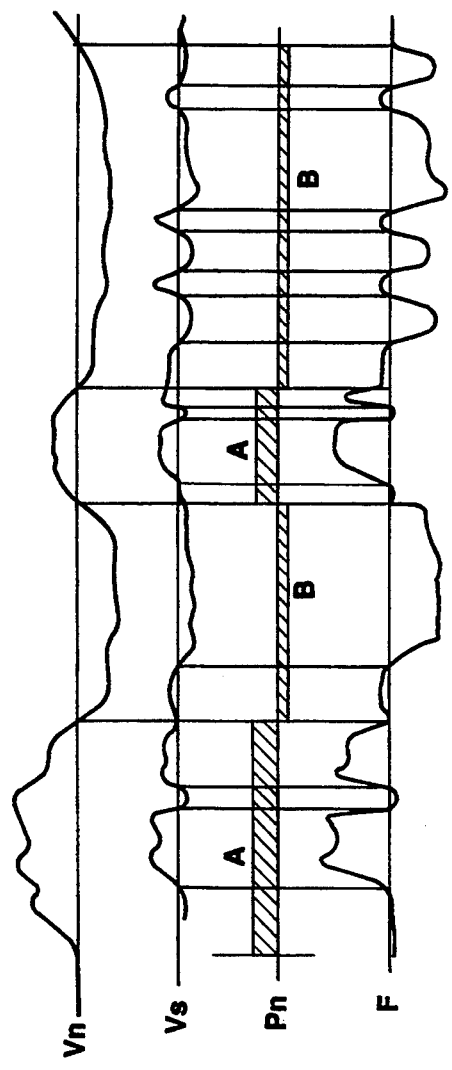
FIG. 20(A) shows a variation of the vertical speed.
FIG. 20(B) shows a variation of the piston speed relative to the cylinder of the shock absorber.
FIG. 20(C) shows a variation of the target position.
FIG. 20(D) shows a variation of the damping force.

Referring to FIGS. 18 and 19, a third embodiment is explained.

The third embodiment is substantially the same as the first embodiment except the use of a routine 400 instead of the routine 200. As compared to the routine 200, the routine 400 is simplified such that the amplitude and sign of a vertical speed value Vn are relied upon to select an appropriate one of three different damping force (F) versus piston speed (Vs) characteristics A, B and 0. The F-Vs characteristic A is illustrated by the fully drawn line in FIG. 18, F-Vs characteristic B is illustrated by the one-dot chain line in FIG. 18, and the F-Vs characteristic 0 is illustrated by the broken line in FIG. 18. The setting of the shock absorber is such that the F-Vs characteristics A, B and 0 (zero) are established when the adjuster of the shock absorber is set to A, B and 0 (zero) positions, respectively.

Referring to FIG. 19, at a block 402, a vertical speed Vn is determined. This block is followed by an interrogation at a block 404 whether the speed value Vn is equal to zero or not. If this is the case, the position 0 (zero) is set as a target position Pn at a block 406. If the interrogation at the block 404 results in a negative outcome, there is another interrogation whether the speed value Vn is positive or not. If the vehicle body is subject to an upward motion, the speed value Vn is positive and thus the interrogation at the block 408 results in an affirmative outcome. Thus, the position A is set as the target position Pn at a block 410. If the vehicle body is subject to a downward motion, the speed value Vn is negative and the position B is set as the target position Pn at a block 412.

FIGS. 20(A), 20(B), 20(C) and 20(D) illustrate the operation of the third embodiment.

What is claimed is:

1. A vehicle comprising:
   a vehicle body;
   a suspension unit supporting said vehicle body and including a shock absorber, said shock absorber having a neutral position, an extended state and a compressed state, said shock absorber being extendable from said neutral position to said extended state, said shock absorber being compressible from said neutral position to said compressed state;
   said shock absorber including first passage means for allowing a first one-way flow of hydraulic fluid to allow extension of said shock absorber from said neutral position, and first valve disc means for restricting said first one-way flow of hydraulic fluid through said first passage means and causing generation of a damping force which resists extension of said shock absorber from said neutral position thereof;
   said shock absorber including second passage means for allowing a second one-way flow of hydraulic fluid to allow compression of said shock absorber from said neutral position, and second valve disc means for restricting said second one-way flow of hydraulic fluid through said second passage means and causing generation of damping force resisting compression of said shock absorber from said neutral position;
   said shock absorber including first bypass passage means for allowing a first bypass flow which bypasses said first valve disc means to allow extension of said shock absorber from said neutral position;
   said shock absorber including second bypass passage means for allowing a second bypass flow which bypasses said second valve disc means to allow compression of said shock absorber from said neutral position;
   said shock absorber including an adjuster having a first position wherein said first bypass passage means is closed and said second bypass passage means is open, and a second position wherein said first bypass passage means is open and said second bypass passage means is closed, whereby a first damping force which is generated during extension of said shock absorber from said neutral position with said adjuster set in said first position, is greater than a second damping force generated during extension of said shock absorber from said neutral position with said adjuster set in said second position, and a third damping force which is generated during compression of said shock absorber from said neutral position with said adjuster set in said second position, is greater than a fourth damping force generated during compression of said shock absorber from said neutral position with said adjuster set in said first position;
   means for generating a signal indicative of a vertical motion of said vehicle body; and
   a control unit responsive to said signal for deriving a direction of a vertical velocity of said vehicle body;
   said control unit being operative to set said adjuster in said first position only when the derived direction of the vertical velocity is upward, and to set said adjuster in said second position only when the derived direction of the vertical velocity is downward.

* * * * *